May 8, 1951     E. C. LISKEY, JR     2,551,750
HATCH COVER AND LOCKING AND SEALING MEANS THEREFOR
Filed Aug. 10, 1949     2 Sheets-Sheet 1
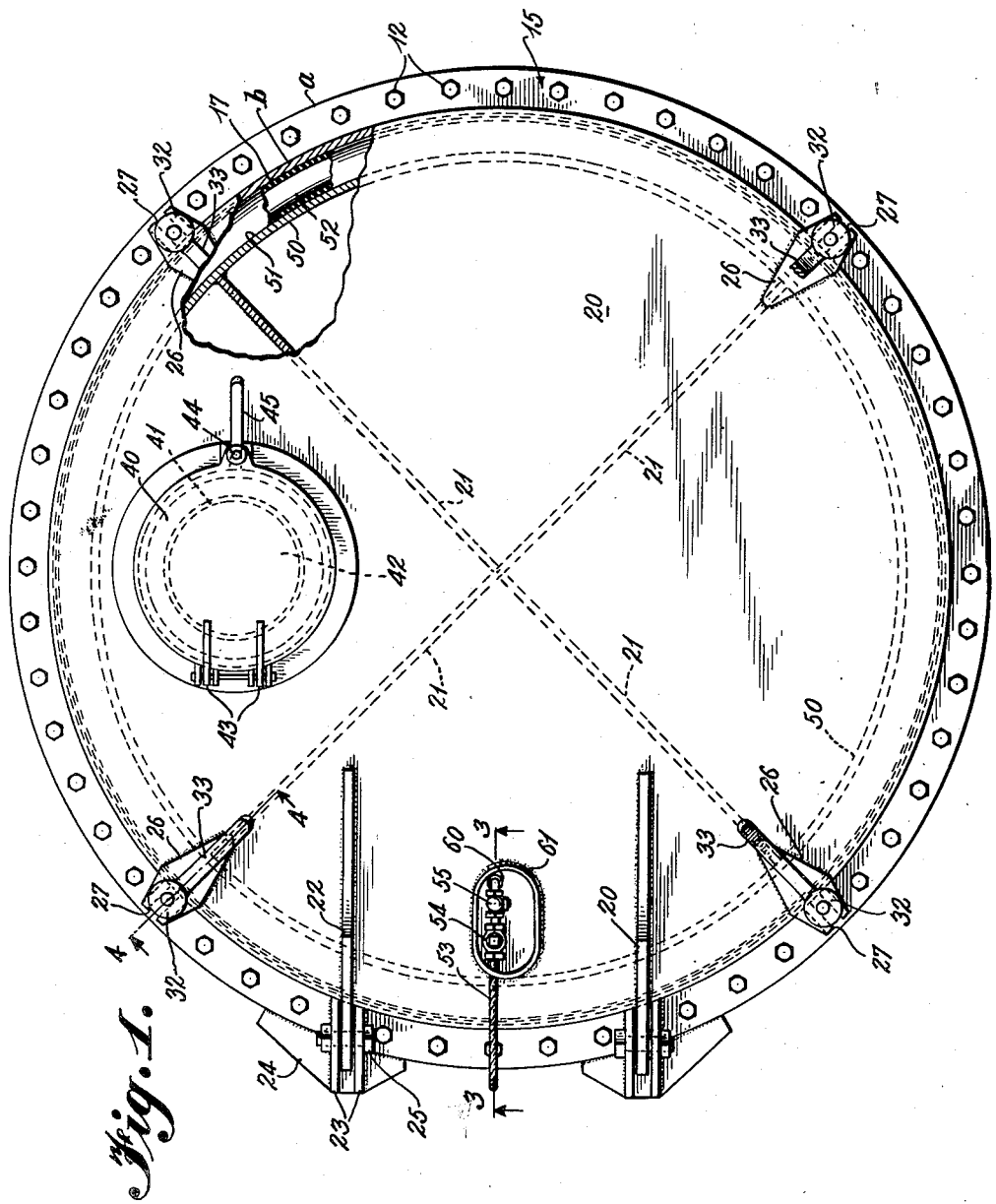
INVENTOR
Ernest C. Liskey, Jr.
BY
ATTORNEY May 8, 1951     E. C. LISKEY, JR     2,551,750
HATCH COVER AND LOCKING AND SEALING MEANS THEREFOR
Filed Aug. 10, 1949     2 Sheets-Sheet 2
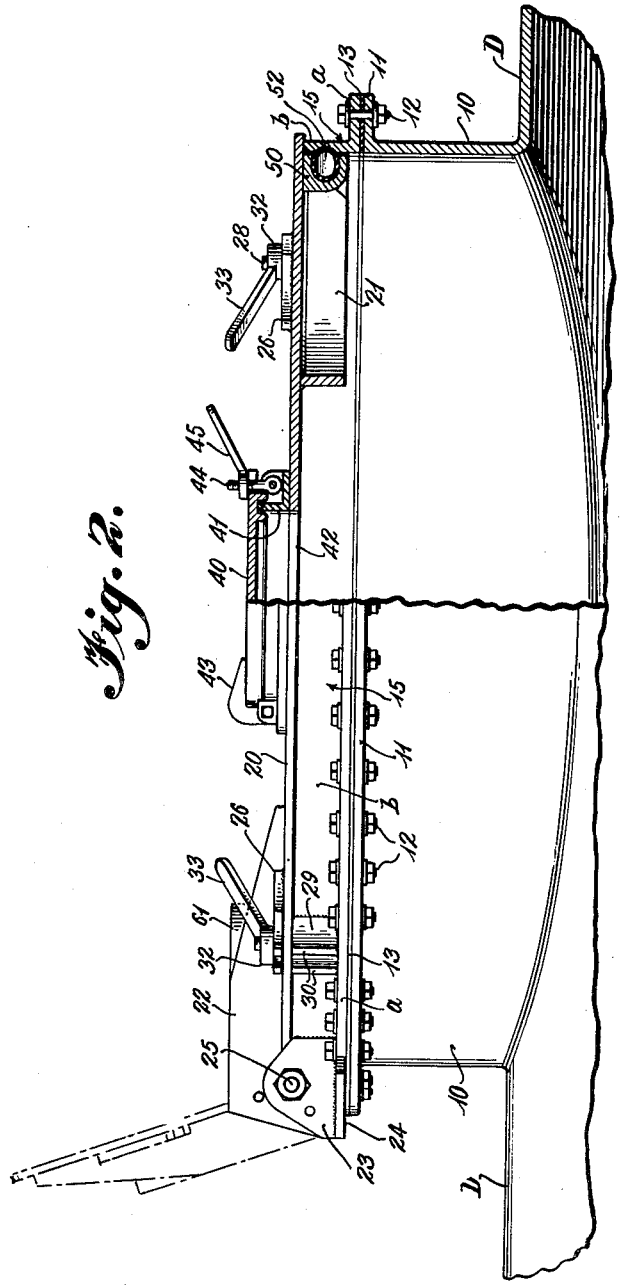
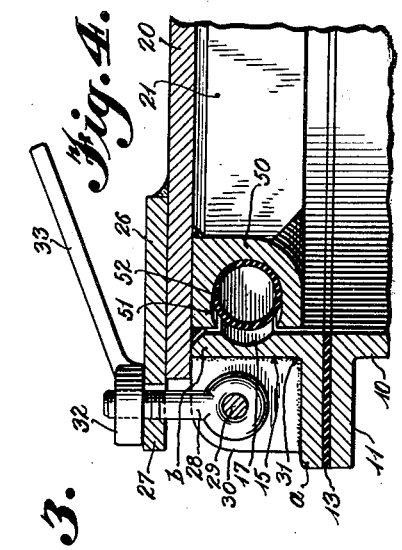
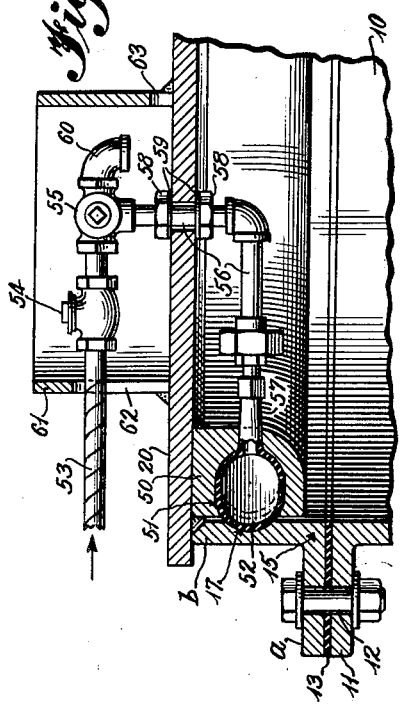
INVENTOR
*Ernest C. Liskey, Jr.*
BY
ATTORNEY Patented May 8, 1951

2,551,750

UNITED STATES PATENT OFFICE 2,551,750

HATCH COVER AND LOCKING AND SEALING MEANS THEREFOR

Ernest C. Liskey, Jr., Severna Park, Md.

Application August 10, 1949, Serial No. 109,512

3 Claims. (Cl. 114—201)

This invention relates to hatches and more particularly relates to hatches having means for establishing a water-tight and oil tight closure seal and hold-down fastening when the hatches are closed.

The hatch of the present invention is, obviously, of general application but has a particular application to those ships where it is important to be able to lock and seal the hatch or to open it almost instantaneously due to requirements or emergencies that quickly arise, as for instance in connection with "oil tankers" and the like.

A principal object of this invention is to provide a practical, reliable, effective and easily operable pneumatic device for establishing an entirely water-tight and oil tight seal and lock-fastening between a hatch coaming and hatch cover when the cover is closed; the device being also easily operable to permit opening of the hatch without any interference or obstruction by the pneumatic sealing device.

Another object of this invention is to provide a pneumatic locking and sealing device of the character referred to which may be made of relatively light-material, is simple, strong, durable and relatively inexpensive in construction comprising very few parts, and may quite easily and inexpensively be applied to hatches of conventional or other constructions.

Another object of this invention is to provide a hatch equipped with a pneumatic closure locking and sealing device of the character stated and in which the pneumatic sealing and fastening device is manipulatable from outside of the hatch into and out of locking and sealing condition; and to provide readily accessible and convenient manually operable means whereby the placing of the pneumatic locking and sealing device into and out of locking and sealing condition may be controlled manually.

A further object of this invention is to provide a hatch construction of the character stated, and which when closed and inflated, will lock and seal the hatch water-tight or oil tight without the need of other locking means, and will not develop leaks or become open even under conditions of storms, high seas and other conditions of travel.

Other objects of this invention will be in part obvious and in part pointed out hereinafter.

In accordance with this invention, the hatch includes a coaming, a cover therefor and an inflatable device carried on the underside of the cover and inflatable to press against both a part on the cover and a part on the coaming and establish a water-tight and oil tight seal and hold-down fastening therebetween, the inflatable device being so designed and so carried on the cover that when it is deflated to a certain extent it withdraws from contact with the coaming and offers no obstruction or interference to the opening of the cover of the hatch. Manually operable means are provided on the exterior of the hatch whereby the flow of air from a source of air under pressure to the inflatable device and the release of air from the inflatable device may be controlled.

The invention accordingly consists in the features of construction, combinations of elements and arrangements of parts which will be more particularly described hereinafter and the scope of the application of which will be set forth in the claims that follow.

In order that a clearer understanding of this invention may be had, attention is hereby directed to the accompanying drawings, forming a part of this application and illustrating certain possible embodiments of this invention, and in which:

Figure 1 is a top elevation of a closed hatch embodying this invention, the view being partly broken away to shown certain parts beneath the cover plate;

Figure 2 is a side view thereof, partly in section;

Figure 3 is a sectional view of a part of the hatch at the air ducts of the pneumatic sealing and fastening device, and is taken on the line 3—3 of Fig. 1; and Figure 4 is a sectional view of another part of the hatch and is taken on the line 4—4 of Fig. 1.

Similar reference characters refer to similar parts throughout the several views of the drawings.

Referring to the drawings, a hatch opening is usually surrounded by a circular coaming 10 that arises upwardly from a deck D and has an outwardly directed flange 11 about its open top. In cases where such coaming 10 is provided, the present invention is applied directly thereto or, otherwise, is applied to the deck. The invention includes, what may be termed, a coaming extension 15 and a hatch cover 20 to which the locking and sealing device is applied and correlated.

The coaming extension 15 is preferably an annularly formed angle-iron, with one web or flange $a$ extending radically outward to provide a foot or base and the other web or flange $b$ extending axially to form a tubular coaming extension. The flange $a$ is riveted, welded or bolted, as at 12, to the deck D or to the flange 11 of the deck coaming 10 and, preferably, in the latter case, with a gasket 13 interposed therebetween. The tubular flange b of the coaming extension 15 extends upwardly of the coaming 10 and defines the opening into the hatch and the hatch cover 20 is provided fitting this opening. Below its upper edges, the tubular flange b has an arcuate groove or recess 17 extending about its inner surface for a purpose, which will be explained hereinafter.

The cover 20 comprises a plate reinforced by web irons 21 secured to the underside thereof and at one side has a pair of hinge arms 22 each of which seats between two hinge pads 23 supported on a hinge plate 24 which is welded to the radial web a of the coaming extension 15, the arms 22 being hinged to the pads 23 by hinge bolts 25.

The hatch is provided with a pneumatic sealing and hold-down fastening device which is manipulatable to fasten the cover on the coaming with water-tight seal at the joint between the cover and coaming of the hatch. As shown, there is an annular carrier member or ring 50 secured, as by welding, to the under side of the hatch cover plate 20, the external diameter of member 50 being such that the periphery of the cover plate 20 projects a slight distance beyond the ring 50 and the exterior surface of ring 50 fits close to the inner surface of web b of the coaming extension iron 15, when the cover is closed on the coaming. Formed in ring 50 is a recess 51 extending thereabout, opening toward the web b and being in radial alignment with the inwardly facing recess or groove 17 of the web b when the cover is closed on the coaming. Seated in recess 51 is an inflatable tube 52 which, when deflated, does not protrude from the recess 51 and preferably is retracted about one-quarter inch or so from the outer surface of ring 50 as indicated by dotted lines in Fig. 3. Means are provided whereby the inflatable tube 52 may be inflated and distended to protrude from recess 51 into the recess 17 and into water-tight and oil tight fastening contact with the inner surfaces of both recesses 51 and 17 and, thus, establish a water-tight or oil tight seal and a strong hold-down fastening between the ring 50 and web b and, consequently, between the cover and the coaming of the hatch, as indicated in full lines in Fig. 3.

Air pressure means are provided to inflate the tube 52 and air release means are provided to deflate the tube 52. The air pressure means include an air conduit 53, preferably flexible or articulated, connected to a source of air pressure, not shown, and leading through a check valve 54 to a three-way valve 55, all on the outside of the hatch cover plate 20, and from valve 55 a conduit 56 leads through the cover plate 20 to a nipple 57 which extends through an aperture therefor provided in ring 50 and into the inflatable tube 52. The place where conduit 56 extends through the cover 20 is made watertight by nuts 58 threaded on the conduit and screwed tight against gaskets 59 interposed between the nuts and the cover plate. The three-way valve 55 may be turned to pass air from conduit 53 to conduit 56 to inflate tube 52 and may be turned to cut off conduit 56 from conduit 53 and to open conduit 56 to an air relief port 60 to deflate the tube 52.

For purposes of protection the valves 54 and 55 may be surrounded by a wall 61 which is welded on the top of cover plate 20, the wall being preferably provided with drain apertures as at 62 and 63.

With tube 52 deflated the hatch cover can be swung open and shut and because tube 52 when deflated is retracted entirely into recess 51 the tube will have no contact with angle iron 15 and will not interfere with or obstruct in any way the opening or closing of the hatch. When it is desired to establish the water-tight fastening of the hatch cover to the coaming, the cover is first closed and optionally battened down by means of the bolts 28 and locking nuts 32, if present. Valve 55 is then set to connect air conduits 53 and 56; and then valve 54 is opened to allow air under pressure to pass to and to inflate tube 52 to such an extent that the tube presses so tightly against the surfaces of the grooves or recesses 17 and 51 that the cover is locked and fastened tightly and strongly on the coaming and a water-tight seal established therebetween. When tube 52 has been inflated sufficiently the air supply may be shut off, leaving the tube inflating air trapped in the tube. Thereafter, the air supply valve, not shown, may be opened from time to time to insure that proper air pressure is maintained in the tube 52, and to compensate for any leakage which may have occurred. In lieu of the above, the shut-off valve may be left open and a pre-regulated air pressure may be maintained constantly in the tube 52.

To equip existing hatches with the watertight and airtight fastening and sealing means of this invention, it is only necessary to secure to the existing hatch coaming the flat ring 14 and bolting, riveting or welding thereto the coaming extension 15, and provide a cover with the necessary carrier ring 50 which carries the inflatable tube 52, establish the air connections to the tube, which when inflated expands into the coaming recess 17. The hatch need not be circular but may be rectangular with rounded corners or may be of other shapes.

Supplemental fastening means may also be provided if desired. For instance, as shown, at spaced points on the top of the cover plate 20, are welded fastening plates 26 having bifurcated ends 27 protruding beyond the periphery of the cover plate and bolts 28, carrying lock nuts 32, are swingingly pivoted on pins 29 carried on bracket plates 30 welded to coaming extension 15, as at 31. These bolts 28 are positioned to be swung upwardly into the bifurcated projecting ends 27 of the fastening plates 26 and to protrude upwardly thereof so that nuts 32 having handles 33 can be applied thereto and, by screwing the nuts down on the bolts, the cover can be clamped tightly down on the top of the coaming extension 15. Four of such supplemental hatch-cover fastening means, just described, are shown in the embodiment illustrated in the drawings.

If desired, the hatch cover 20 may also be provided with an ullage cover 40, which latter may be fitted to a coaming 41 of an opening 42 in the hatch cover plate 20, and may be hinged, as at 43, to the coaming 41 or to the cover plate 20; swinging bolts 44 and nuts 45 being provided whereby the ullage cover 40 may be tightly clamped down on the coaming 41 or unclamped from the coaming so that it can be raised for inspection, sampling or other purposes.

As many changes may be made in the above construction and as many different possible embodiments of this invention may be made without departing from the scope thereof, it is understood that all matter contained in the above description or shown in the accompanying drawings can be interpreted as illustrative and not in a limiting sense.

That which is claimed as new is:

1. A hatch of the type described for use with an annular coaming wall having an outwardly extending flange about its top, and comprising an annular angle-iron member having a lower web to rest on and securable to said coaming wall flange and with its body web aligning with and forming an extension of said coaming wall, a cover including a cover plate hinged to the exterior of said angle-iron member and an annular carrier member secured to the underside of the cover plate and dimensioned and positioned to fit within the body web of said angle iron member when the cover is closed on said angle iron member, the interior surface of said body web of said angle iron member and the outer surface of said annular carrier member having mutually facing recesses when the cover is closed on said angle iron member, an inflatable tube carried in the recess of said annular carrier member and dimensioned to lie wholly within said latter recess when deflated, and means for inflating said tube to expand and press said tube tightly against the surfaces of both said recesses and thereby to establish a water-tight and oil tight hold-down fastening between said annular carrier member and said angle iron member.

2. A hatch of the type described for use with an annular coaming wall having an outwardly extending flange about its top and comprising an annular angle-iron member having a lower web to rest upon and securable to said coaming wall flange and with its body web aligning with and forming an extension of said coaming wall, a cover including a cover plate and an annular carrier member secured to the underside of the cover plate and dimensioned and positioned to fit within the body web of said angle-iron member when the cover is closed on said angle-iron member, the interior surface of said body web of said angle-iron member and the outer surface of said annular carrier member having mutually facing recesses when the cover is closed on said angle-iron member, an inflatable tube carried in the recess of said annular carrier member, and means for inflating said tube to expand and press said tube tightly against the surfaces of both said recesses including an air duct leading from said tube through said cover plate and having an operable control valve positioned outside of said cover plate, whereby a water-tight and oil-tight hold-down fastening may be established between said carrier member and said angle-iron member.

3. In a hatch of the type described, in combination, a hatch coaming defining the hatch opening and having a continuous horizontal depression in the surface of its inner wall adjacent the upper edge of the coaming, a hatch cover plate fitted to rest on the coaming to close the hatch opening and having a depending part fast to its under face and positioned to extend into and lie in juxtaposition to the interior wall of the coaming when the cover is closed on the coaming, said depending part of the cover plate having a continuous annular recess in its outer surface and positioned to face and complement the depression in said coaming when the cover is closed on the coaming, an inflatable annular tubular member carried by and nested in the recess of the said cover part and dimensioned to lie wholly within said recess when deflated, an air duct extending through the cover to the outside thereof and in communication with said inflatable member whereby said inflatable member may be inflated to expand and press tightly against the walls of both said depression and recess, and valve means in said air duct for controlling the passage of air to said inflatable member, said duct including a flexible portion for permanent connection to a source of air pressure supply, whereby said cover may be opened without disconnecting said air duct.

ERNEST C. LISKEY, Jr.

REFERENCES CITED

The following references are of record in the file of this patent:

UNITED STATES PATENTS

| Number | Name | Date |
| --- | --- | --- |
| 1,795,571 | Nielsen | Mar. 10, 1931 |
| 2,088,909 | Jaubert | Aug. 3, 1937 |
| 2,104,144 | Zand | Jan. 4, 1938 |
| 2,360,276 | Redmond | Oct. 10, 1944 |
| 2,361,298 | Laddon | Oct. 24, 1944 |

FOREIGN PATENTS

| Number | Country | Date |
| --- | --- | --- |
| 720,803 | France | July 29, 1931 |
| 731,455 | France | Sept. 3, 1932 |
| 438,774 | Great Britain | Nov. 22, 1935 |